July 19, 1949.　　E. C. WAKEFIELD　　2,476,689
TRELLIS STRUCTURE
Filed Jan. 2, 1947
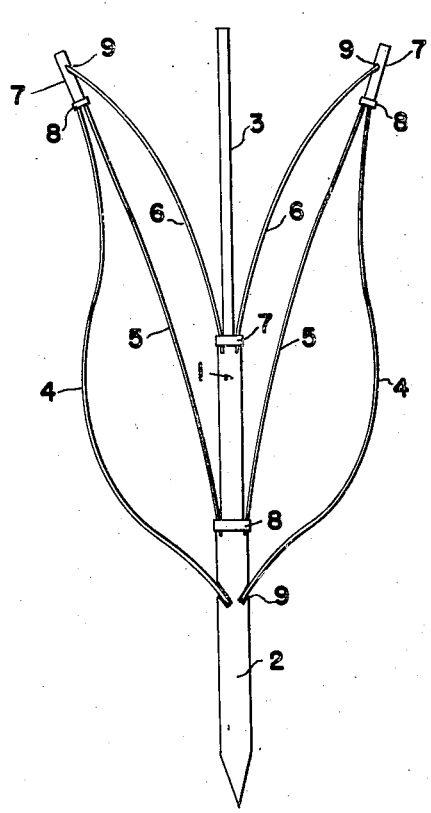
Fig. 1
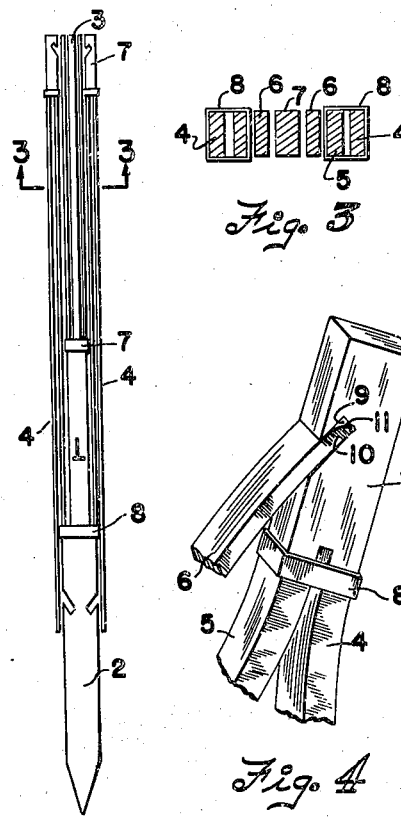
Fig. 2
Fig. 3
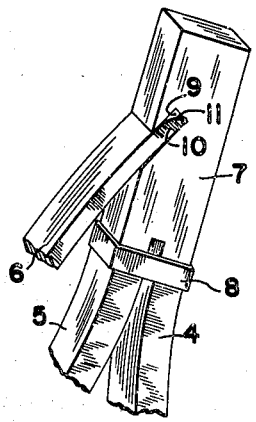
Fig. 4
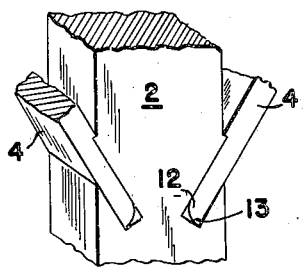
Fig. 5
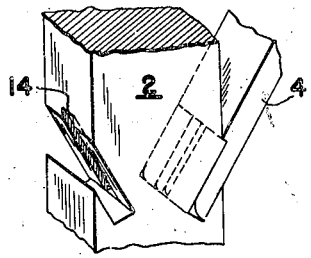
Fig. 6
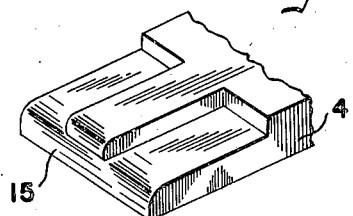
Fig. 7
INVENTOR
EDWIN C. WAKEFIELD
BY *[signature]*
ATTORNEY Patented July 19, 1949

2,476,689

UNITED STATES PATENT OFFICE 2,476,689

TRELLIS STRUCTURE

Edwin C. Wakefield, Bristol, Conn., assignor to Isabelle Heath, Bristol, Conn.

Application January 2, 1947, Serial No. 719,660

4 Claims. (Cl. 47—47)

My invention relates to garden and lawn trellises and more particularly to a collapsible trellis adapted to support plants, shrubs, vines and the like.

Heretofore, it has been suggested to provide trellises wherein the flexible elements used to support a plant or the like are maintained in spaced relation, with respect to the body portion of the trellis, by means of spreaders or spacers comprising separate pieces of material having recesses formed therein adapted to embrace the flexible elements; it has also been suggested to provide trellises wherein the plant supporting elements are maintained in separated position by means of a spacer, in combination with a bowed member nailed or otherwise secured to the free ends of the elements.

While the prior trellis structures, of the type referred to above, function for the purpose for which they are intended, they are open to objections which are inherent in their construction. One of the major difficulties with the use of spacers or spreaders arises in connection with the assembly of the trellis. If the trellis is of the type wherein the flexible elements are formed by means of a plurality of parallel saw cuts longitudinally of the body portion of the trellis, considerable skill is required to fit the spacer and force it downwardly of the elements in a manner to prevent cracking or breaking of the spacer or elements. After the spacer is properly positioned, difficulty is encountered in attaching the top member to the free ends of the plant supporting elements, since the top piece must be bowed and nailed to the ends of the elements.

After considerable research and experimentation, I have found that the deficiencies of the prior arrangements can be overcome by eliminating the conventional spacer or spreader, and the bowed end piece; more particularly I have found that desired separation of the plant supporting elements can be maintained by locking means formed integral with the elements or with parts thereof.

An object of my invention is to provide an improved collapsible trellis.

Another object of my invention is to provide an improved collapsible trellis having means integral therewith adapted to maintain the plant supporting elements in desired separated position.

Yet another object of my invention is to provide an improved collapsible trellis wherein the free ends of certain of the plant supporting elements are constructed and arranged for interlocking engagement with portions of other of said elements or with the body portion of the trellis.

Still another object of my invention is to provide an improved unitary collapsible trellis which may be quickly and easily assembled without the aid of tools or special implements.

A further object of my invention is to provide an improved unitary collapsible trellis, formed from a single piece of material characterized by economies in manufacture and ease of assembly.

A still further object of my invention is to provide an improved collapsible trellis which is comparatively strong and rugged in construction and designed for long and continued use.

Yet a further object of my invention is to provide a unitary collapsible trellis having improved locking means formed integral with the plant supporting elements or portions thereof, whereby the elements are securely held in desired spaced relationship with respect to the body portion of the trellis.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawings:

Figure 1 is a front elevational view showing a trellis of the present invention in the assembled position.

Fig. 2 is a plan view of the trellis of Fig. 1 in folded position.

Fig. 3 is a sectional view along line 3—3 of Fig. 2.

Fig. 4 is a detail view of an end portion of one pair of plant supporting elements.

Fig. 5 is a detail view showing the ends of the outer pair of elements in locking engagement with the base of the trellis.

Fig. 6 is a detailed view of a modified form of locking arrangement; and

Fig. 7 is a detailed view of the end of the flexible elements shown in Fig. 5.

Referring to the drawings and more particularly to Fig. 1, the improved trellis of the present invention is shown in assembled position. The trellis comprises a body portion, designated generally by numeral 1, having a peg member 2, a vertical piece 3, and a plurality of flexible plant or shrub supporting elements 4, 5 and 6, formed integral with the body of the trellis, as by conventional scarfing of the material from which the trellis is formed.

It will be noted that the pairs of flexible elements are symmetrically arranged with respect to the body portion 1 and that the outside pair 4—4, and the intermediate pair 5—5 terminate on common end portions 7. In order to prevent splitting at the bases of the cuts adjacent the body portion 1 and the common end portions 7, suitable metal ferrules 8 are provided. While only three pairs of elements are shown, it will be appreciated that the number of pairs may be increased, as desired.

The flexible elements are maintained in spaced plant supporting relationship by means of notches 9 formed in the peg member and in the ends 7. As shown in Fig. 4, the notch formed in the end 7 is cut at an angle having an upward slope and that the end 10 of element 6 is cut as at 11 to facilitate insertion of the end 10 into the notch. As will be seen in Fig. 1, the notches 9 formed in the peg member 2 slope downwardly, and that the ends 12 of elements 4 (Fig. 5) are cut as at 13.

In assembling the trellis, assuming that it is in the folded position shown in Fig. 2, the flexible elements 4, 5 and 6, at one side of the trellis are pulled outwardly from the central body portion a sufficient distance to permit insertion of end 10 of element 6 into notch 9 in the end member 7; element 4 may then be bowed outwardly and the free end 12 thereof inserted into notch 9 in the peg portion. Complete assembly is effected, to provide a trellis as shown in Fig. 1, by repeating the above described operations with the elements on the other side of the body portion.

It will be noted (Fig. 2) that the pairs of flexible elements are of progressively shorter lengths from the outside pair to the innermost pair, and that the notches 9 in the peg member are located above the ends of the outer elements when the trellis is in the collapsed position. By means of this arrangement, sufficient bowing is obtained to provide desired spaced relation between successive elements, and at the same time place the elements under stress or tension, so that the ends thereof are maintained in tight frictional engagement with slotted or notched portions.

The present invention comprehends the provision of trellises of various sizes. For example, miniature or small trellises, in accordance with my improved design may be used to support plants which normally grow in conventional flower pots or in larger containers; for outside use, lawns, gardens and the like, larger trellises of heavier and more rugged parts are required. With trellises designed for outside use, additional locking between the ends of the elements and the notches may be required, for the purpose of preventing lateral movement of the ends of the elements. Accordingly, as shown in Figs. 6 and 7, the elements may be attached to the peg member 2 or to the end portions 7 by means of a tenon type joint.

It will be seen in Fig. 6 that the notches 9 are recessed longitudinally to provide slots 14 adapted to receive the raised portion 15 (Fig. 7), formed by cutting away the end portion of one of the elements 4. In this modification, the ends of the elements are securely locked within the notches, thus preventing side-wise slippage due to the tension produced by bowing the elements plus other forces developed by the weight of the plant or shrubs.

While I have shown and described the preferred embodiment of my invention, I wish it to be understood that I do not confine myself to the precise details of construction hereinset forth, by way of illustration, as it is apparent that many changes and variations may be made therein, by those skilled in the art, without departing from the spirit of the invention or exceeding the scope of the appended claims.

I claim:

1. A collapsible unitary trellis of the character described comprising a body portion formed with a peg member at one end thereof, said body having a plurality of symmetrical pairs of plant supporting elements integral therewith, the length of each pair of elements being progressively shorter from the outside pair to the innermost pair, said peg member having recesses formed therein adapted to receive the free ends of the outside pair of elements, the free ends of said elements being seated in the recesses when the elements are arranged in plant supporting position, the opposite ends of said outside pair having notches therein to receive the free ends of the innermost pair of elements when the innermost pair of elements are in plant supporting position, whereby to maintain the trellis elements in spaced plant supporting relationship.

2. A collapsible unitary trellis of the character described comprising a body portion formed with a peg member at one end thereof, said body having a plurality of symmetrical pairs of plant supporting elements integral therewith, the length of each pair of elements being progressively shorter from the outside pair to the innermost pair, the intermediate pair of elements and the outer pair of elements terminating in common end portions, said peg member having notches formed therein adapted to receive the free ends of the outside pair of elements, said common end portions having notches formed therein adapted to receive the free ends of the innermost pair of elements, the free ends of the outside pair of elements and the free ends of the innermost pair of elements being seated in the notches formed in the peg member and in the common end portions, respectively, when the trellis elements are arranged in plant supporting position.

3. A collapsible unitary trellis of the character described, comprising a body portion formed with a peg member at one end thereof, said body having a plurality of symmetrical pairs of plant supporting elements integral therewith, the length of each pair of elements being progressively shorter from the outside pair to the innermost pair, means to attach the free ends of the outside elements to the peg member, when said elements are in plant supporting position, comprising a tenon type joint between said peg and each of the free ends of the outside pair of elements, the opposite ends of said outside pair having notches formed therein to receive the free ends of the innermost pair of elements when said elements are arranged in plant supporting relationship.

4. A collapsible unitary trellis of the character described, comprising a body portion formed with a peg member at one end thereof, said body having a plurality of symmetrical pairs of plant supporting elements integral therewith, the length of each pair of elements being progressively shorter from the outside pair to the innermost pair, the intermediate pair of elements and the outer pair of elements terminating in common end portions, means to attach the free ends of the outside pair of elements to the peg member, when said elements are in plant supporting position, comprising a tenon type joint between said peg and each of the free ends of the outside pair of elements, said common end portions, having notches formed therein adapted to receive the free ends of the innermost pair of elements the free ends of the innermost elements being seated in the notches, when said elements are in plant supporting position.

EDWIN C. WAKEFIELD.

REFERENCES CITED

The following references are of record in the file of this patent:

UNITED STATES PATENTS

| Number | Name | Date |
|---|---|---|
| 1,983,956 | Wakefield | Dec. 11, 1934 |